United States Patent
Tozaki et al.

(10) Patent No.: US 8,161,651 B2
(45) Date of Patent: Apr. 24, 2012

(54) METHOD FOR MANUFACTURING A DOOR-TRIM ASSEMBLY AND ITS ASSEMBLY LINE

(75) Inventors: Takanobu Tozaki, Toyokawa (JP); Masanori Tomioka, Toyokawa (JP)

(73) Assignee: Sintokogio, Ltd., Aichi (JP)

( * ) Notice: Subject to any disclaimer, the term of this patent is extended or adjusted under 35 U.S.C. 154(b) by 657 days.

(21) Appl. No.: 12/065,632

(22) PCT Filed: Sep. 5, 2006

(86) PCT No.: PCT/JP2006/317558
§ 371 (c)(1), (2), (4) Date: May 7, 2009

(87) PCT Pub. No.: WO2007/029704
PCT Pub. Date: Mar. 15, 2007

(65) Prior Publication Data
US 2009/0211075 A1    Aug. 27, 2009

(30) Foreign Application Priority Data
Sep. 5, 2005    (JP) .................................. 2005-256023

(51) Int. Cl.
*B21D 53/88*    (2006.01)
(52) U.S. Cl. ...................................................... 29/897.2
(58) Field of Classification Search .................... 29/505, 29/235, 428, 821, 822, 783, 786, 789, 790, 29/795, 796, 826, 423, 897.2, 897.32, 721, 29/757; 280/703.2, 751; 296/146.7, 39.1
See application file for complete search history.

(56) References Cited

U.S. PATENT DOCUMENTS
5,197,172 A    3/1993    Takagi et al.

FOREIGN PATENT DOCUMENTS
JP    4-354660    12/1992
JP    2001-270002    10/2001

*Primary Examiner* — John C Hong
(74) *Attorney, Agent, or Firm* — Finnegan, Henderson, Farabow, Garrett, & Dunner, L.L.P.

(57) ABSTRACT

A process and assembly line for assembling a door-trim assembly in which resin-made door-trim parts are automatically fixed to a resin-made door-trim main body. Resin-made door-trim parts and deformable members associated therewith are temporarily installed to a resin-made door-trim main body. In a deforming processing unit (3), an electrically operated cylinder (10) equipped with an ultrasonic oscillator (2) extends and contracts and is rotatable within a horizontal plane by a ball screw mechanism (12). To the deformable members of the resin-made door-trim parts temporarily installed on the resin-made door-trim main body, the ultrasonic oscillator (2) comes close in opposite relationship by driving of the electrically operated cylinder (10) and ball screw mechanism (12), and performs ultrasonic irradiation. Consequently, the deformable members are deformed and the resin-made door-trim parts corresponding thereto are fixed to the resin-made door-trim main body.

4 Claims, 5 Drawing Sheets

METHOD FOR MANUFACTURING A DOOR-TRIM ASSEMBLY AND ITS ASSEMBLY LINE

FIELD OF THE INVENTION

This invention relates to a method for manufacturing a door-trim assembly used for the interior of a vehicle, and its assembly line.

BACKGROUND OF THE INVENTION

The substance of a conventional process of manufacturing a door-trim assembly used for the interior of a vehicle relies on manual tasks. First, a plurality of various shaped resin-made door-trim parts, and various types of deformable members for fitting the resin-made door-trim parts in their deformed states, are temporarily and manually installed on a resin-made door-trim base. These temporarily installed deformable members are then manually deformed by means of a hand tool to fix the resin-made door-trim parts to the resin-made door-trim base such that the door-trim assembly is assembled.

As described above, presently the substance of such an operation relies on manual work. There is no prior-art document that describes the skills used in such an operation. To fix each resin-made door-trim part that is tacked to the resin-made door-trim base, for example, the worker should manually allocate the proper hand tool for the deformable member that corresponds to the resin-made door-trim parts to be fixed. Because each hand tool is designed to be exclusively used for each type of resin-made door-trim base, it lacks a general versatility. Therefore, if a shape or a type of resin-made door-trim base is replaced with another one, the hand tool should also be replaced with another one, one that is adapted to be used for the new base. Further, because the worker handling the hand tool should move in response to the location where the resin-made door-trim part is to be fixed, the manual operation used is cumbersome.

Considering the forgoing circumstances, the object of the present invention is to provide a method for manufacturing a door-trim assembly and its assembly line in which the operation is simplified and, as well, the general versatility is improved.

SUMMARY OF THE INVENTION

As used herein, the term "a door-trim assembly" refers to a product in which a resin-made door-trim part is fixed to a resin-made door-trim base by means of a deformable member. A decorative small part or parts, etc., may be mounted on the door-trim assembly that is manufactured by the method for manufacturing the door-trim assembly and its assembly line of the present invention.

One aspect of the present invention provides a method for assembling a door-trim assembly in which a resin-made door-trim part is fixed to a resin-made door-trim base. The method comprises temporarily installing the resin-made door-trim part and its associated deformable member on the resin-made door-trim base; moving an attachment that has the function to deform the deformable member so as to have it face, and then to cause it to approach, the corresponding deformable member, by a moveable supporting means that supports the attachment; and applying the function of the attachment to the corresponding deformable member to deform it such that the resin-made door-trim part that has been temporarily installed on the resin-made door-trim base is fixed thereon by deforming the deformable member, to produce the door-trim assembly.

Another aspect of the present invention provides an assembly line for assembling a door-trim assembly in which resin-made door-trim parts are fixed to a resin-made door-trim base. The assembly line comprises means for temporarily installing the resin-made door-trim parts and their associated deformable members on the resin-made door-trim base; supporting means for movably supporting attachments wherein each attachment has the function to deform the corresponding deformable member and for moving the attachments to an opposed relationship and close to the corresponding deformable member and retract from the corresponding deformable member; means for carrying the resin-made door-trim base on which the resin-made door-trim parts and the deformable members have been temporarily installed; a first conveying means for conveying the carrying means from a section for temporary installation to the supporting means; a section for detaching the door-trim assembly from the carrying means, wherein the door-trim assembly is conveyed to the supporting means by the first conveying means via the carrying means such that the resin-made door-trim parts are fixed to the resin-made door-trim base by the deforming function of the attachment; and a second conveying means for conveying the carrying means from which the door-trim assembly has been detached to the section for temporary installation.

Preferably, each supporting means is configured as a unit such that the number of supporting means can be increased or decreased.

In one embodiment of the present invention, each supporting means includes a plurality of vertically-moving mechanisms for moving the respective attachments to the respective predetermined levels such that the respective attachments are opposed to the respective deformable members; and a laterally-moving mechanism for laterally moving the respective attachments that are opposed to the respective deformable members such that the respective attachments are close to, and retract from, the respective deformable members.

The assembly line preferably further includes a controller for automatically controlling the attachments, the vertically-moving mechanisms, and the laterally-moving mechanisms.

In the method for manufacturing the door-trim assembly and its assembly line of the present invention, both the resin-made door-trim part and the deformable member may be a plurality, to conform with, for example, the shape of the door-trim assembly. In this case, a plurality of supporting means may be employed such that each function of the plurality of attachments supported by a plurality of supporting means to deform the deformable members may include generating ultrasonic waves, deforming an engageable pawl, deforming a retainer, or deforming a screw.

To deform the deformable member or members, as described above the method for manufacturing the door-trim assembly and its assembly line of the present invention employ a movable supporting means for supporting an attachment or attachments. Each attachment has the function to deform the corresponding deformable member. This is instead of using a conventional hand tool to be manipulated by a worker.

Each attachment is close to, and retracts from, the corresponding deformable member by the supporting means to apply the function of the attachment to the corresponding deformable member to deform it such that each resin-made door-trim part that has been temporarily installed on the resin-made door-trim base can be fixed to it.

THE BEST MODE OF THE EMBODIMENTS

In reference to the overhead view in FIG. 1, an outline of the assembly line on which the present invention is used for manufacturing a door trim will now be explained. Arranged on the assembly line for manufacturing the door trim, in order from upstream (the left side of FIG. 1) to downstream (the right side of FIG. 1), are a plurality of devices for a temporary installation (means for temporary installation) 1 for temporarily attaching resin-made door-trim parts (not shown) and their associated deformable members (not shown) to a resin-made door-trim base, a plurality of deforming machines (supporting means) 3 for fixing the resin-made door-trim parts to the resin-made door-trim base by means of the deformations of the deformable members, and a vertically-movable ejector 7 for ejecting a door-trim assembly in which the resin-made door-trim parts are fixedly mounted on the resin-made door-trim base. Each tacking device 1 for tacking the resin-made door-trim parts and the deformable members to the resin-made door-trim base may be, e.g., a conventional industrial robot in an automotive assembly line.

Figure 2:
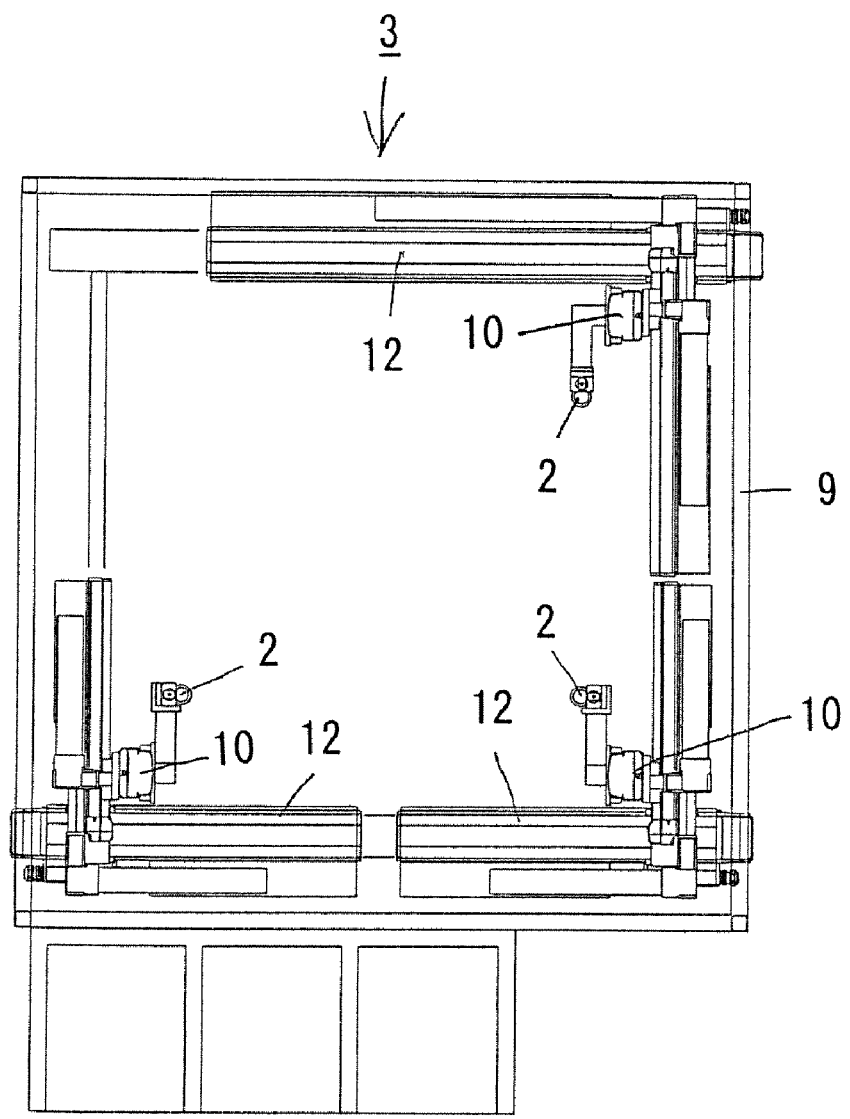
FIG. 2 shows a schematic and elongated view of the part shown in FIG. 1 along a dotted line A.
Figure 3:
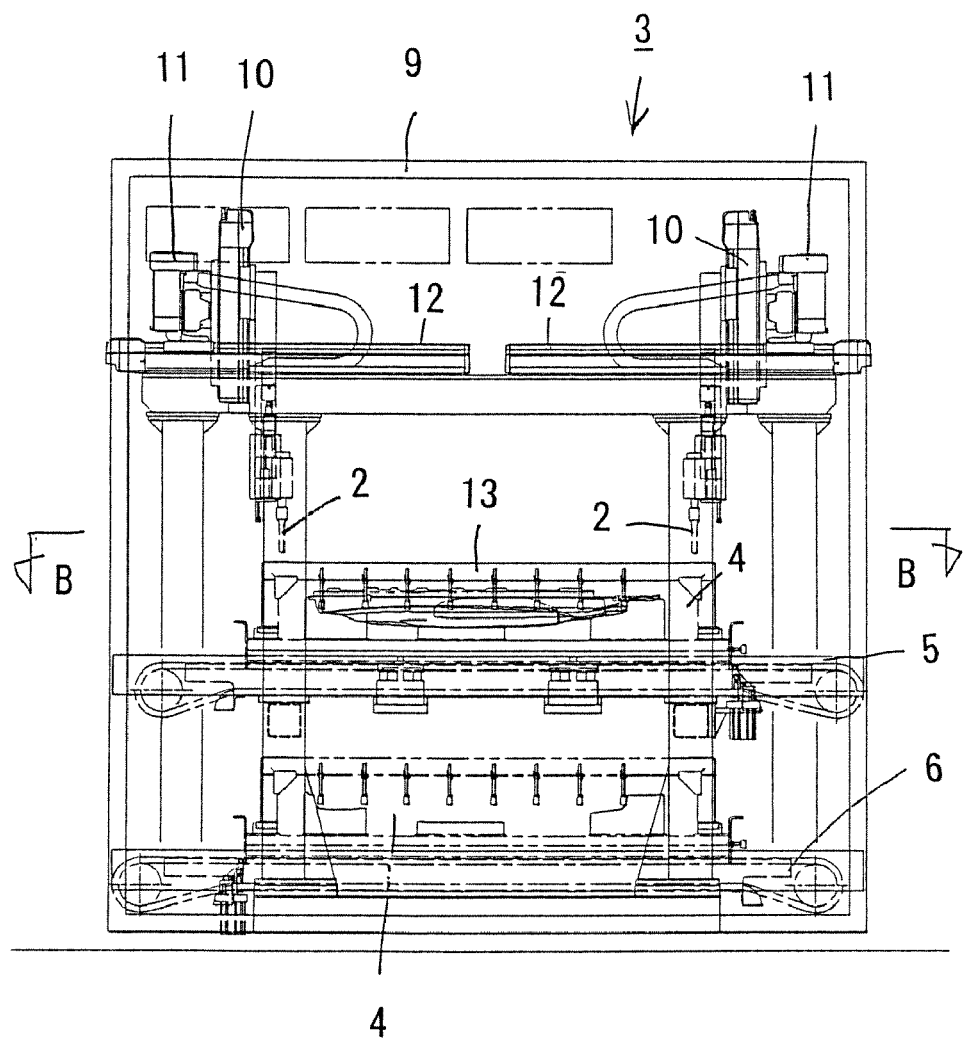
FIG. 3 is a front elevational view of FIG. 2.
Figure 4:
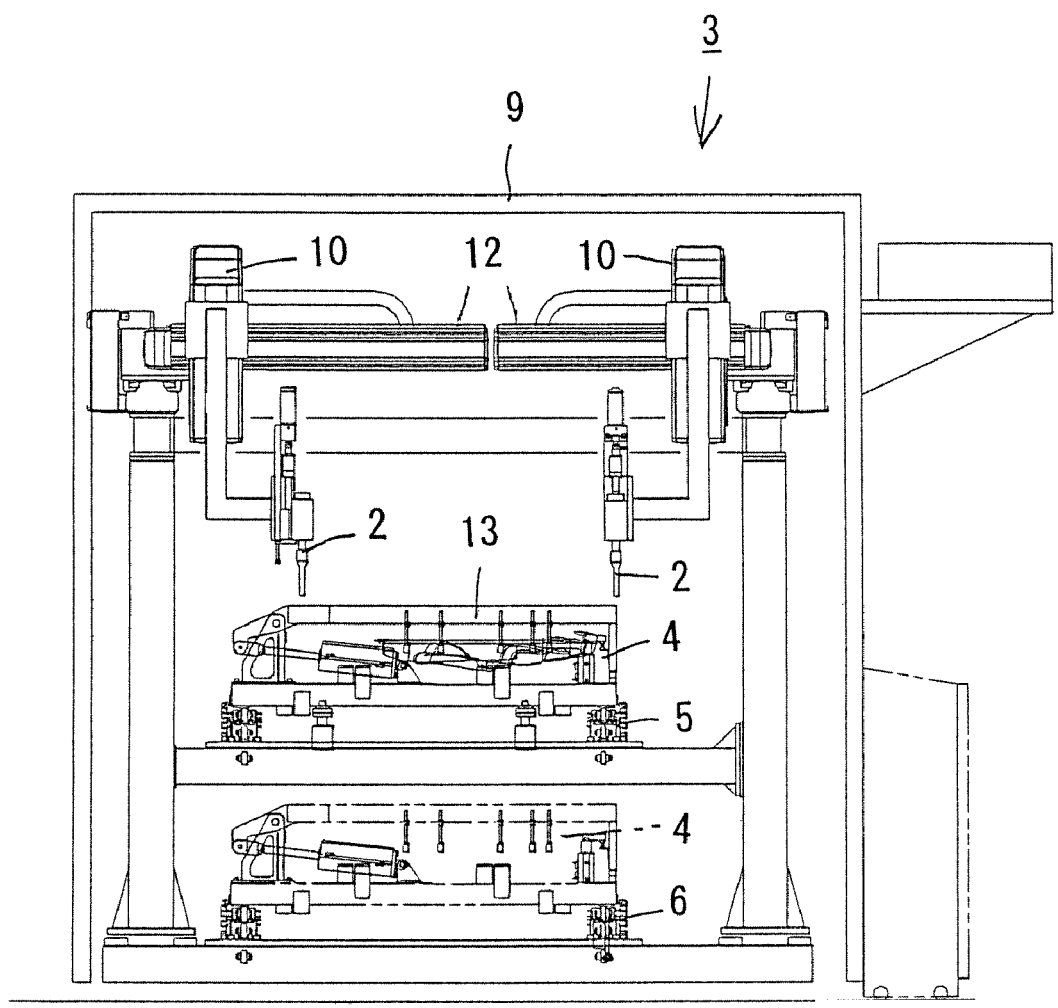
FIG. 4 shows a right-side view of the view of FIG. 3.
Figure 5:
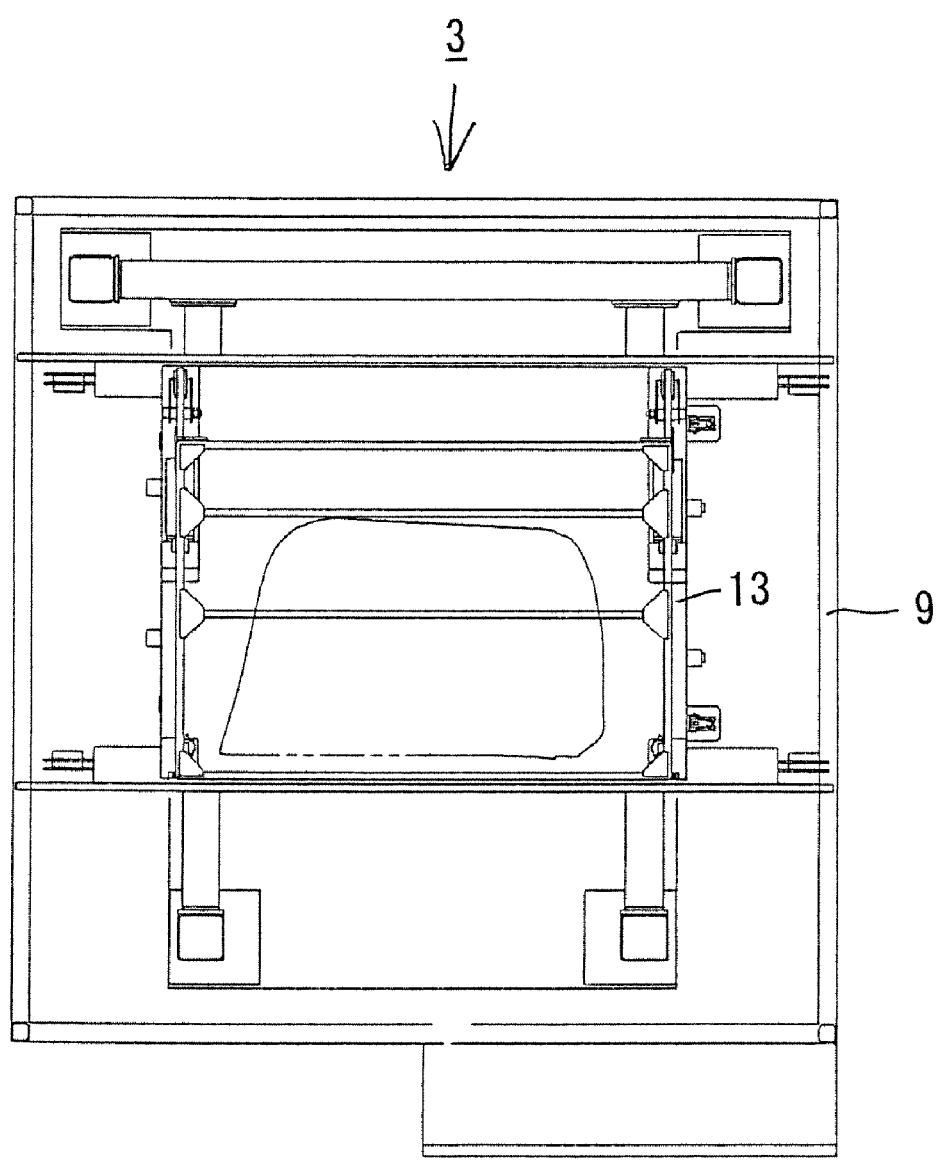
FIG. 5 shows a view taken along arrows B-B in FIG. 3.

In reference to FIGS. 1 to 5, an assembly line of the door trim will now be described in detail. As shown in FIGS. 2, 3, and 4, each deforming machine 3 supports a plurality of attachments 2. Each has a function to deform the deformable members such that the attachments 2 can be vertically moved to respective optional levels. The deforming machine 3 comprises a building frame 9 in which shaped steels are assembled as a rectangular structure, a plurality of electric cylinders (vertically-moving means) 10 for vertically moving the attachments 2, and a ball-screw mechanism (laterally-moving means) 12 with a plurality of servo motors 11 (FIG. 3) that are mounted on the building frame 9 to rotate the electric cylinders 10 in a horizontal plane. Each deforming machine 3 may be configured as an independent unit so that the number of deforming machines 3 to be installed may be decreased or increased.

The assembly line further includes a plurality of jigs 4, which are similar to a machine platen (carrying means) (FIGS. 3 and 4) on which the resin-made door-trim base to which the resin-made door-trim parts are tacked is located, an upper belt conveyor (a first conveying means) 5, and a lower belt conveyor (a second conveying means) 6 (FIGS. 3 and 4). The upper and lower belt conveyors 5 and 6 are arranged in the deforming machine 3 such that a predetermined vertical interval is formed therebetween to transfer the jig 4 through the deforming machine 3.

On the rear side of the jig 4, a latticed holding member 13 (FIGS. 3, 4, and 5) is pivotally mounted on the jig 4 such that it can be pivoted up and down to hold the resin-made door-trim base between it and the jig.

The vertically-movable ejector 7, which was described by reference to FIG. 1, at its top position (not shown) removes the door-trim assembly in which the resin-made door-trim parts are fixed to the resin-made door-trim base, from the jig 4. The door trim assembly is conveyed to the ejector 7 by the upper conveyor 5 that runs from upstream to downstream on the line. The vertically-movable ejector 7, at its lowest position (not shown) puts the empty jig 4 from which the door-trim assembly is detached on the lower conveyor 6, which runs from downstream to upstream on the line.

Figure 1:
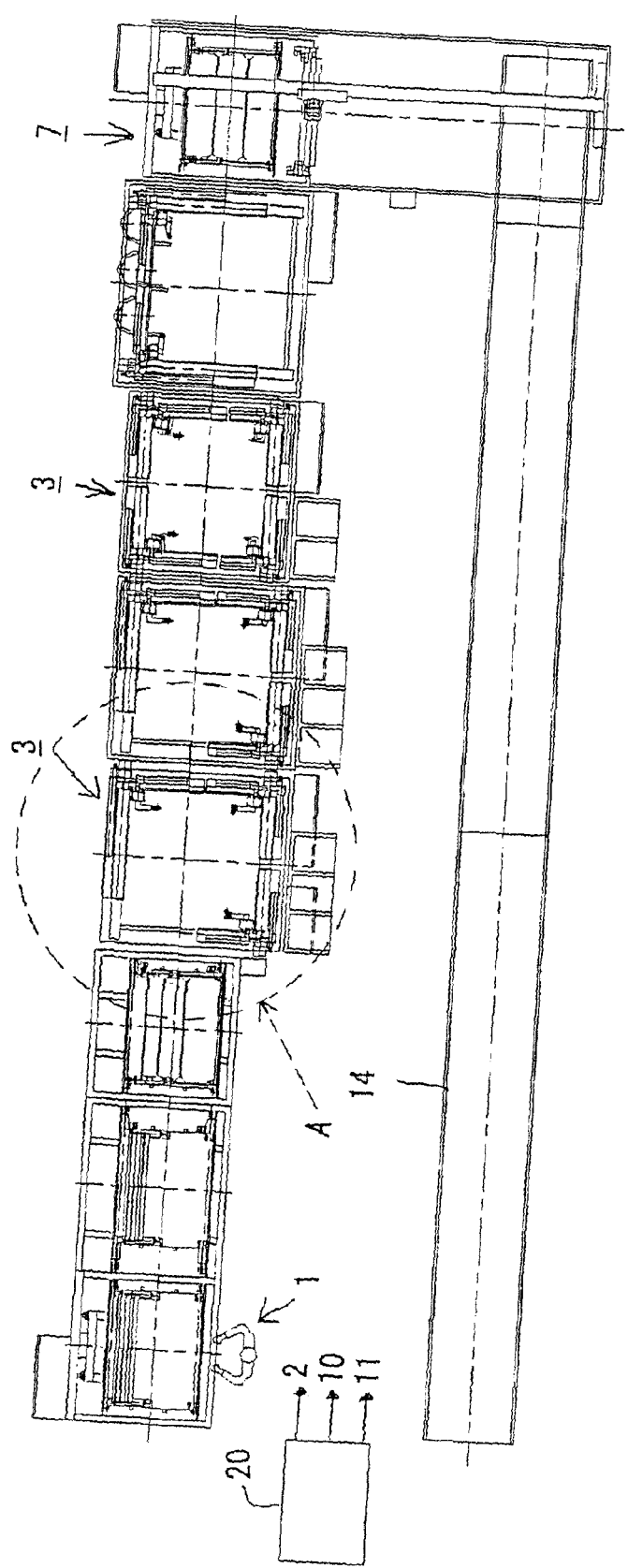
FIG. 1 shows a schematic overhead view of an embodiment of the assembly line of the door-trim assembly of this invention.

The separate deforming machines 3 are arranged from upstream to downstream in series, as shown in FIG. 1. Although the basic designs of the respective deforming machines 3 are the same, the functions of the respective attachments 2 (FIGS. 2, 3 and 4) on each deforming machine that deform the deformable members differ from each other. The functions of the respective attachments 2 that are mounted on the respective deforming machines include the deforming, by ultrasonic waves, the deforming of engageable pawls, the deforming of retainers, and the deforming of screws, in this order from the upstream attachment to the downstream attachment on the line. But the functions of the deforming machines used in the present invention are not limited to these examples.

Among a plurality of the deforming machines 3, the function of the uppermost one, which is shown in FIGS. 2, 3, and 4, is to deform the deformable members by generating ultrasonic waves. Preferably, each deforming machine 3 may support one attachment 2 such that the attachment can be replaced with another attachment. The attachment that has a specific deforming function may be replaced with another attachment that has another deforming function in accord with, e.g., the forms of the deformable members.

The various attachments 2, the electric cylinders 10, and the servomotors 11, are all electrically connected to a controller 20, which is schematically illustrated in FIG. 1, to control them.

The manufacturing line for the door trim of the present invention may include an optional step to further process the door-trim assembly. In that step the resin-made door-trim parts and the resin-made door-trim base are completely assembled. The manufacturing line may also include a further belt conveyor 14 for transferring the door-trim assembly to attach, e.g., small ornaments to it.

In the manufacturing line as arranged and explained above, at a tacking section the resin-made door-trim parts and the deformable members are tacked to the resin-made door-trim base that is clamped between the holding member 13 and the jig 4.

The jig 4, on which the resin-made door-trim base is located, is then transferred into one deforming machine 3 by means of the upper belt conveyor 5. The servomotor 11 in the ball-screw mechanism 12 is then driven by an operational command signal from the controller 20 to move the attachment 2 to a level at which it is opposed to the corresponding deformable members. The operational command signal to be provided to the servomotor 11 is preset to cause each attachment 2 to face the corresponding deformable member that is tacked on the resin-made door-trim base.

The controller 20 then lowers the attachment 2 that is already at the level where it faces the corresponding deformable member by extending the electric cylinder 10 such that the attachment 2 approaches the corresponding deformable member. In such a position, the controller 20 applies the function of the attachment 2 to the corresponding deformable member. For example, in this embodiment the function of the attachment of the deforming machine 3 that is located furthest upstream is to generate the ultrasonic waves. The ultrasonic waves are applied to the corresponding deformable member to deform it such that the resin-made door-trim part is fixed to the resin-made door-trim base by means of the deformable member that has been deformed.

Such a process of deforming by the attachment 2 of the deforming machine 3 is executed in the other deforming machines 3 such that the other deformable members are treated by the respective attachments 2, i.e., the deforming by the ultrasonic waves, the deforming of the engageable pawls, the deforming of the retainers, or the deforming of screws. Consequently, the resin-made door-trim parts that have been tacked to the resin-made door-trim base are fixed to it by various deformable members, to produce the door-trim assembly.

The jig 4, on which the door-trim assembly is located, is transferred by the upper belt conveyor 5 from the deforming machine 3 at the most downstream position, i.e., the right side in the figures, to the ejector 7, where the door-trim assembly is detached from the jig 4.

The empty jig 4, from which the door-trim assembly has been detached, is lowered by the ejector 7 such that it is put on the lower belt conveyor 6 from under the deforming machine 3 on the most downstream part of the line. The empty jig 4 is then returned to the tacking device 1 by the lower belt conveyor 6 that passes under the other deforming machines 3.

The door-trim assemblies, in each of which the resin-made door-trim parts are fixed to the resin-made door-trim base, can be intermittently manufactured by repeating the above process.

The door-trim assembly that is detached from the jig 4 is transferred to the following process by, e.g., the belt conveyer 14, as shown in FIG. 1.

Because the above embodiment just illustrates the present invention, and is not intended to limit it, various modifications are possible. For instance, the door-trim assembly that is manufactured by the method for manufacturing it and its assembly line may by the following process further rig up small ornaments, or may be coated with paint. The door-trim assembly that is manufactured by the method of the present invention also includes one in which such a following step is further applied. Similarly, the assembly line of the present invention, which optionally includes such a following step, is also included in the assembly line of the present invention.

The invention claimed is:

1. An assembly line for assembling a door-trim assembly in which resin-made door-trim parts are fixed to a resin-made door-trim base, said assembly line comprising:

means for temporarily installing resin-made door-trim parts and deformable members associated therewith on a resin-made door-trim base at a section for temporary installation;

plural supporting means for movably supporting respective attachments, each attachment having a function of deforming a corresponding deformable member, and for moving said attachments to oppose, approach, and retract from the corresponding deformable member, wherein the function of the respective attachments supported by the plurality of supporting means of deforming a deformable member includes generating ultrasonic waves, deforming an engageable pawl, deforming a retainer, or deforming a screw and wherein each supporting means is configured as a unit such that the number of supporting means can be increased or decreased;

means for carrying said resin-made door-trim base on which said resin-made door-trim parts and said deformable members associated therewith have been temporarily installed;

a first conveying means for conveying said carrying means from the section for temporary installation to said plural supporting means where said resin-made door-trim parts are fixed to said resin-made door-trim base by the deforming function of said attachments of said plural supporting means to form a door-trim assembly;

a detaching section for detaching said door-trim assembly from said carrying means; and a second conveying means, for conveying said carrying means from which said door-trim assembly has been detached at the detaching section to said section for temporary installation.

2. The assembly line of claim 1, wherein each supporting means supports one attachment such that it can be replaced with another attachment.

3. The assembly line of claim 1, wherein each supporting means that movably supports said attachment, and that moves said attachment to face and approach the corresponding deformable member, includes:

a plurality of vertically-moving mechanisms for moving the respective attachments to respective predetermined levels such that said respective attachments are opposed to a respective deformable member; and a laterally-moving mechanism for laterally moving said respective attachments that are opposed to said respective deformable members such that said respective attachments are close to and retract from said respective deformable members.

4. The assembly line of claim 3, wherein the assembly line further includes a controller for automatically controlling said attachments, said vertically-moving mechanisms, and said laterally-moving mechanisms.

* * * * *